Fig. 2

United States Patent Office 3,280,009
Patented Oct. 18, 1966

3,280,009
PROCESS AND APPARATUS FOR SPRAY EVAPORATION
Paul Ackermann and Paul Cullmann, Moers, Germany, assignors to Rheinpreussen Aktiengesellschaft fuer Bergbau und Chemie Homberg, Niederrhein, Germany, a corporation of Germany
Filed Nov. 7, 1960, Ser. No. 67,580
Claims priority, application Germany, July 13, 1959, R 25,935; Nov. 12, 1959, R 26,711; Oct. 8, 1960, R 28,847
11 Claims. (Cl. 203—40)

This invention relates to a new process for the separation and recovery of the volatile components of a mixture containing the same in admixture with non-volatile components. More particularly, this invention relates to a new and improved process for the continuous separation and recovery of the volatile components of a mixture containing the same in admixture with non-volatile components. The invention is a continuation-in-part of application Serial No. 41,544, filed July 8, 1960, now abandoned.

In chemical processes there are frequently formed, in the course of the synthesis, residues which contain considerable amounts of the synthesis product and which must be processed for the recovery thereof in order to avoid substantial losses. The processing of such residues has been found in many instances to be so time-consuming, costly, or both, that such processes are not readily undertaken. Thus, for example, in the process for the manufacture of phthalic acid anhydride by oxidizing naphthalene or o-xylene with air in the presence of oxidation catalysts, such as vanadium catalysts, there is formed through side reactions a black non-volatile material. The side reactions occur partially in the contacting and partially in the preliminary thermal treatment of the crude phthalic acid anhydride in the presence of the sulphuric acid formed from the sulphur compounds originally present in the raw naphthalene or added subsequently. This black material or residue is very finely distributed in the molten phthalic acid anhydride raw product and remains in the distillation residue of the phthalic acid anhydride.

The process for the synthesis of phthalic acid anhydride, in commercial operation, carries out the distillation only to that point at which there is still present in the distillation residue a sufficient amount of phthalic acid anhydride permitting the handling of the residue as a melt at the temperature of the vacuum distillation (about 200 degrees C. plus or minus 20 degrees C.). This amount lies in a minimum of content of about 30 weight percent of phthalic acid anhydride in the distillation residue. In order to avoid any subsequent difficulties in removing the distillation residue from the distillation apparatus, the distillation is conventionally interrupted at a point where the distillation residue consists of equal parts of the black non-distillable material and of phthalic acid anhydride. In commercial practice, about 4 weight percent of the crude phthalic acid anhydride is lost with the non-distillable black material and in interrupting the distillation at point where the distillation residue is composed of 50 weight percent of the black non-distillable material and 50 weight percent phthalic acid anhydride, an additional 4 weight percent of phthalic acid anhydride is lost.

The recovery of this phthalic acid anhydride is carried out by vacuum distillation in batch operation in a retort equipped with a stirring device, which must be capable of maintaining movement and comminuting the contents of the retort in its transition from liquid to viscous-plastic to viscous-solid and finely brittle-solid. This continuous movement of the retort contents is necessary in the heat distillation of the phthalic acid anhydride from the distillation residue in order for there to be sufficient heat-transition from the retort wall, only heatable from the outside, to the material being distilled. It is known to use for this purpose disproportionately strong stirring devices or stirring devices which are provided with plowing or scraping attachments. Nevertheless, the process is most difficult to operate because the material being treated tends to scale out and block and embrittle the apparatus and because in direct fire heating, the formation of volatile condensation products which impede the refining of the phthalic acid anhydride cannot be avoided. Furthermore, it will readily be appreciated that the emptying of the retort of the residue consisting of the black non-volatile material, which accumulates in varying grain magnitudes and with a considerable proportion of fine dust, is necessary on account of the low spontaneous ignition temperature of 360 degrees or less of this material is both a dangerous procedure and one which is difficult to carry out. Particular safety measures and/or a long cooling off time of the retort are required rendering the process most inefficient. According to the type of construction of the retort employed, the retort must, after each addition or batch, or after certain time intervals, be manually emptied or cleaned and if necessary the black non-volatile residue adhering to the retort wall must be broken away with a demolishing hammer.

The above-described type of residue distillation because of the difficulties which are peculiar to synthesis products of the type of phthalic acid anhydride and the treatment thereof as well as the complicating difficulties, and in particular the extreme difficulty of residue removal is not considered a commercially satisfactory procedure for the recovery of such synthesis products, as for example phthalic acid anhydride, from the synthesis residues containing the same.

An object of the instant invention is to overcome the many difficulties inherent in and peculiar to the separation and recovery of synthesis products from the synthesis residues containing the same when that residue is composed both of volatile and non-volatile components. Another object has been to recover the non-volatile components of the synthesis residue in a granular solid form. A third object has been to dispense with the slow process of distillation as heretofore practiced with its consequent high fuel, labor, and repair costs. The above and other objects will become more fully apparent from the following specification which, by way of illustration, rather than limitation, sets forth preferred processes constituting embodiments of the present invention, the scope of which is defined in the appended claims.

In the accompanying drawing.

In the development and evolution of the spray evaporation process known per se for the purpose of applying the same to a more satisfactory phthalic acid anhydride recovery from synthesis residues containing the same, a process has been arrived at which not only permits substantially quantitative recovery of phthalic acid anhydride from distillation phthalic acid anhydride residues derived from naphthalene and o-xylene oxidation in a continuous and automatic and automatically controlling operation but which is also applicable to other mixtures of a similar nature.

According to the present invention, there is provided a process for the separation and recovery of the components of a mixture consisting of both volatile and non-volatile components which comprises forming a fluid melt of said mixture, introducing said melt so that a large surface area of the melt is formed into an evaporation zone, contacting the said melt in said evaporation zone with a heated gas, the heat of said gas serving to at least partially vaporize the volatile components of said mixture, said gas further serving as a carrier for any of the vapors formed in the contacting, and thereafter separating from he carrier gas the vapor components of said mixture contained therein.

As contacting gases there are suitable, for example, any of the combustion gases of carbonaceous compounds such as are frequently used in the chemical industry, i.e. the so-called safety gases, as well as the reaction gases which contain in addition to other substances, the substance to be recovered from the mixture through the process in accordance with the invention. In the separation of the vapors formed in the treatment of the residue from the contacting gas, the amount of the said substance already present in the gas is simultaneously recovered. Instances of gases suitable in accordance with the invention include for example coke oven gas, water gas, blast furnace gas, after the same has been substantially freed of its oxygen, carbon dioxide gas, and the reaction gas from the synthesis of phthalic acid anhydride, maleic acid anhydride, etc. For the prevention of the formation of the corresponding acid from the anhydride, the carrier gas is freed from any water contained therein to that extent that its dew point lies lower than the lowest gas temperature. A particularly advantageous gas for use in the invention is carbon dioxide on account of its higher specific heat.

In accordance with the invention, the melt is introduced into the evaporation zone so as to provide therein a large surface area for contact with the treatment gas and preferably the melt is contacted in the form of multitudinous fine liquid droplets thereof. The volatile components of these droplets are evaporated on contact with the heated gas introduced into the evaporation zone. The distribution as multitudinous fine, liquid droplets is effected by supplying the mixture in the form of a highly fluid melt by means of a heated dosing conveyor device continuously onto a rotating distributing body, as for example a centrifugal force atomizing apparatus which is arranged within the evaporator.

Surprisingly, in accordance with the invention the best separation effect of the voltatile components from the non-volatile components of the mixture is obtained with relatively low peripheral velocities of the rotating distributor body acting as centrifugal atomizer. The velocities employed lie between 5–90 m./sec., and preferably at about 20–50 m./sec. At these low peripheral velocities, the particles of melt have a size in the range of about 20 to 100 microns (0.02 to 0.1 mm.) which is sufficiently low for the complete evaporation and sufficiently high for the atomatic trickling off of the non-volatile granules from the gas phase. Consequently, the non-volatile constituent is almost completely separated out in the lowest part of the evaporator.

Figure 2:
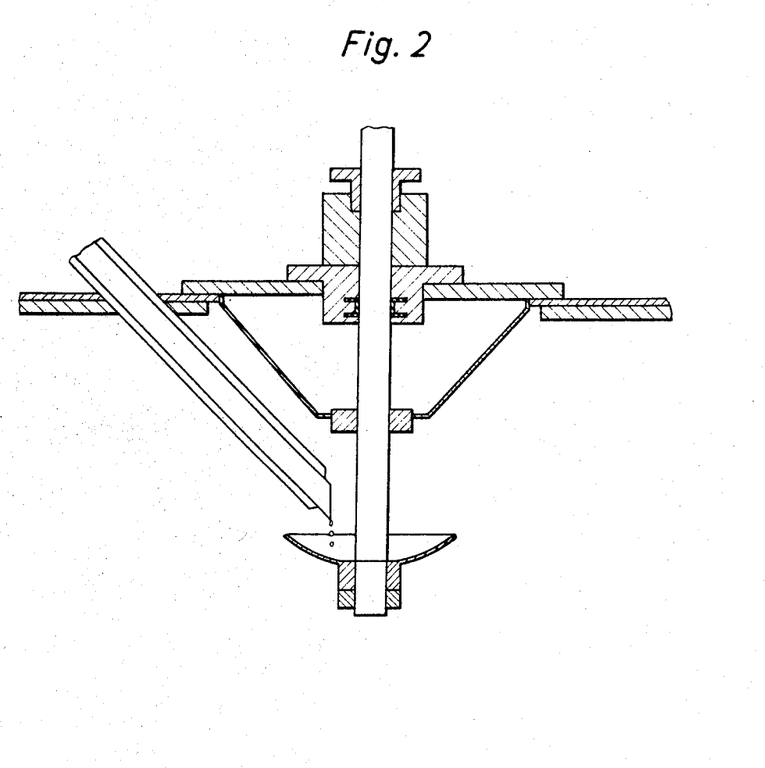
FIGURE 2 is a sectional view of a preferred form of the distributor body.

The form of construction of the centrifugal body which has been found to be most advantageous is that of a flat bowl open at the top, of about 16 to 24 cm. in diameter whose inner surface has preferably an approximately spherical curvature with a maximal angle of inclination as against the horizontal, immediately at the upper edge, of 60 degrees, preferably of 20–35 degrees as has been shown in FIGURE 2.

Frequently, the residue mixture to be processed, as for example the phthalic acid anhydride residue, contains in the molten state, in addition to a major portion of finely distributed particles, also coarser, hard-to-plastic particles which tend customarily to block the valve in the pumps and/or circuit lines and thereby prevent the correct dosaging of the batched material. This disturbance of the output capacity of the pumps employed in the working up of such mixtures has made questionable the feasability of the process in accordance with the invention. It has been suggested that these difficulties be avoided through installation of hot gas blowers which would permit the obtaining of temperatures up to about 450 degrees C. Apart from the fact that such means are quite expensive, the additional difficulty exists that lubricants of corresponding high heat-resistance must be employed in such installations. It is, therefore, particularly important that the process in accordance with the invention be carried out so that small quantities of melts and preferably quantities lying below 200 litres per hour are to be conveyed and to be dosed with correspondingly small pumps and/or valves.

Figures 3, 4:
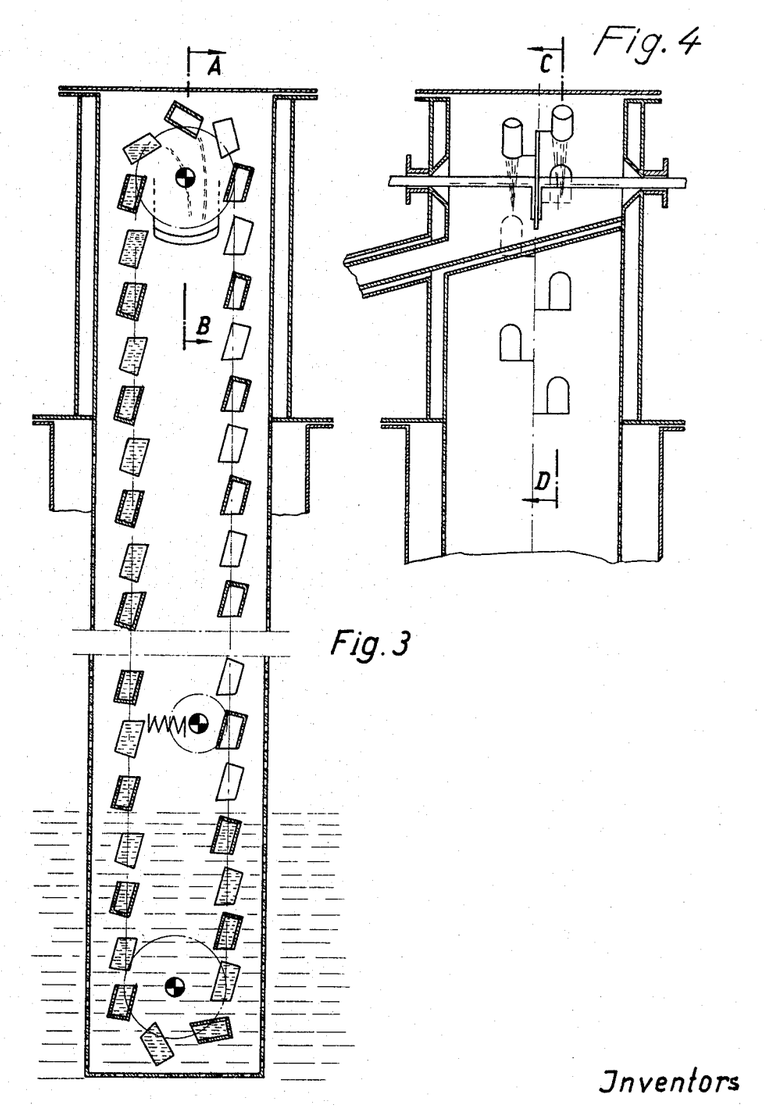
FIGURE 3 is a central vertical sectional view of a conveying and dosing device.
FIGURE 4 is a sectional view, taken on the line A–B and viewed in the direction of the arrows.

It was found that inhomogeneous melts of the above mentioned kind are conveyed and dosed completely free of disturbances through a scooping device having a controllable speed of rotation. FIGURES 3 and 4 each represent an example of the preferred form of execution of such construction. The cups are each of about 30 ccm. filling content and are positioned on both sides of a cog wheel chain with such an angle of inclination that they discharge their contents into the channel before reaching the upper point of return. Hereby the scooping device may be positioned perpendicularly. The part of the scooping device dipping, i.e. immersing, into the sump of the storage container may be surrounded by a sieve basket.

The heated feed pipe for charging the material from the channel of the scooping device to the distributor body arranged in the evaporator is maintained so wide that the gas chambers of the storage container and of the evaporator stand in pressure equilibrium. The pressure equilibrium may also additionally be secured through a separately heated connecting pipe between the two containers.

The gas to be used for contacting the melt is, before admission into the evaporator, brought to the desired temperature. Thus, if for example carbon dioxide or coke-oven gas, etc. are utilized as a treatment gas, the same are first passed in direct or indirect heat exchange, whereby there is imparted thereto the heat necessary to effect the volatilization of the volatile component of the melt. If a reaction gas, such as for example, a phthalic acid anhydride synthesis reaction gas is used as the treatment gas, then it may be necessary to first cool off the gas before the same is admitted into the evaporator.

The evaporator may also be heated indirectly employing for said heating, either the hot treatment gas or another heat exchange medium which has been brought to the required temperature in a separate heat exchange device by means of the hot reaction gas.

The evaporator is preferably provided with gas inlet means at the upper portion thereof positioned so that the introduction of the gas into the center of the evaporator is ensured and also whereby cooling and concomitant condensation of vapors at the wall of the evaporator is avoided.

The residue particles from which the volatile components have all been removed are collected in the main at the bottom part of the evaporator, while any particles carried along in the vapor laden gas are separated therefrom in one or more cyclone separators. The finely granular non-volatile residue is continuously removed from the bottom of the evaporator and the cyclone or cyclones via a sluice. In order to avoid the possibility of spontaneous ignition of this finely granular, non-volatile residue, it is desirable to rinse the accumulated granular residue with as heavy a gas as possible, periodically from below said gas being substantially free from oxygen. In this manner, any volatile material entrapped between the fine granules of non-volatile residue are extensively dislodged. This measure serves additionally to prevent matting or felting of the finely granular residue particles after the same has been cooled off in the sluice to temperatures at which needles of phthalic acid anhydride would form.

In accordance with a further embodiment of the invention, the volatile components of residue may be separated from the non-volatile components by treatment of the residue in an evaporator which is indirectly heated by heat exchange means, which heat exchange means may be the hot reaction gas from a synthesis in which the residue has been obtained. The evaporation of the volatile components of the residue may also, in accordance with a further embodiment of the invention be effected in a thin layer evaporator. The recovery of the volatile product is thereafter effected in the conventional means as for example by condensation, solution, or absorption.

The process in accordance with the invention is advantageously utilized for the recovery of phthalic acid anhydride from residues contining the same which residues have been obtained by oxidizing naphthalene or o-xylene with air in the presence of vanadium catalysts. These residues contain about 30–80 weight percent of phthalic acid anhydride. The phthalic acid anhydride contained in these residues is in accordance with the invention recovered by volatilization thereof through direct or indirect heat exchange of the molten residue with hot gases, utilizing the heat of these gases for the evaporation. In order to remain outside of the explosion limits of the phthalic acid anhydride gas mixture, it is necessary to adjust the quantity of residue being processed and the quantity of hot gas used in said processing so that the phthalic acid anhydride vapor content of a gas lies below 1.7 volume percent or above 10.5 volume percent and/or below 100 grams or above 650 grams in $Ncm.^3$ gas. The phthalic acid anhydride free residue is recovered from the bottom of the evaporator and cyclone separators and the phthalic acid anhydride recovered from the gas containing the same by cooling.

In accordance with the invention, the separation of the vaporous, volatile substance, as for example phthalic anhydride from the reaction gas is effected through cooling either step-wise, i.e. by indirect cooling in a gas cooler as liquid and then in one-or-two gas coolers, as crystals, or the entire phthalic acid anhydride vapors may be separated from the carrier gas in a single gas cooler in which the cooling agent is conducted through the cooling elements with an entrance temperature of below 50 degrees C. and in counter-current to the carrier gas containing the vapors so that the cooling elements at the carrier gas admission side attain a temperature of above 131 degrees C. whereby the phthalic acid anhydride is separated out as a liquid while the remaining phthalic acid anhydride is separated out as crystals at the cooling elements on the gas outlet side. By heating up the cooling device, the phthalic acid anhydride deposited in crystalline form in the cooling apparatus is from time to time melted off from the walls and other elements and recovered.

The invention is illustrated but not restricted by the following examples:

EXAMPLE 1

This example illustrates the recovery of phthalic acid anhydride from the residue of the distillation of raw phthalic acid.

Figure 1:
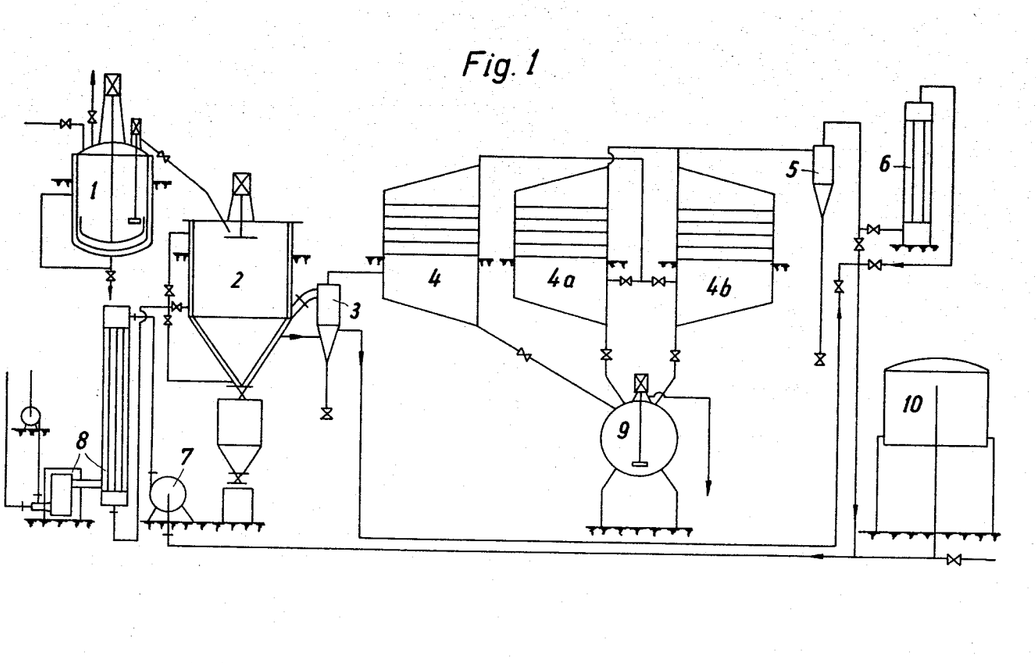
FIGURE 1 is a diagrammatic representation of a preferred form of apparatus for practicing the invention.

In processing 100 kg./h. of distillation residue derived from phthalic acid anhydride production, which consists of 75 weight percent of phthalic acid anhydride and up to 25 weight percent of phthalic acid anhydride free residue, there is circulated in the apparatus shown in FIG. 1, 200 $Nm.^3$ per hour of dry carrier gas by means of the blower 7. The carrier gas used was produced through the combustion of coke-oven gas with air and consists of about 89.5% of $N_2$, about 10.3% of $CO_2$ and traces of oxygen. The carrier gas is heated to about 470° C. in a gas heater 8, which is heated with the waste gas of a coke-gas burner to about 500° C. or higher.

The carrier gas is thereafter conducted upwardly in the main current in a helical path through a jacketed chamber around the cylindrical part of the evaporator 2 and enters through several slots concentrically into the evaporator at a point directly below the lid of the evaporator. The gas entering the evaporator has a temperature of about 450 degrees C.

A second stream of the heated carrier gas amounting to 10–20 $Nm.^3/h.$ is previously branched off for the indirect heating of the lower conical part of the evaporator 2 and of the cyclone separator 3.

The storage container 1 is provided with a stirring device and is maintained at about 200 degrees C. There is continually scooped up with a cup device 11 (FIG. 2) 100 kg./h. of the distillation residue which is emptied into the channel 12 and flows therein continuously to the bowl 13 (FIG. 2) having a diameter of 20 cm. and which rotates at 50 revolutions per second. The distillation residue is thereby distributed into small droplets which droplets during passage through the gas chamber totally lose their phthalic acid anhydride content through evaporation. The evaporation residue, i.e., residue free of phthalic acid anhydride in the form of spherical particles having about 0.05 mm. diameter or below almost entirely drop to the bottom of the evaporator and collect in the lower conical part thereof. The accumulated residue is rinsed with a little inert gas for the removal therefrom of any carrier gas rich in phthalic acid anhydride and trapped between the residue particles. This measure serves to prevent the matting or felting of the residue after the same has been cooled off in the sluice to temperatures of below 131 degrees C. by the needles of phthalic acid anhydride which would otherwise thereby form.

As a result of the evaporation of the phthalic acid anhydride, the carrier gas cools off to about 250 degrees C. The gas-vapor-mixture contains at its emergence from the evaporator and prior to entrance thereof into the cyclone separator 3 (FIG. 1) about 5.6 vol. percent phthalic acid anhydride vapor, and has a dew point which lies at about 200 degrees C. or a little thereunder.

The gas-vapor-mixture is conducted at a temperature of somewhat above 200 degrees C. through the phthalic acid anhydride liquid separator 4 in which it is cooled down to about 137 degrees C. by indirect cooling with coolant cycled from the phthalic acid anhydride solid separator or separtors 4a and/or 4b. In this cooling there are separated about 67 kg./h. of liquid phthalic acid anhydride which flows into the collecting container 9.

In the solid separators 4a and/or 4b, the gas-vapor-mixture is cooled down to about 20 degrees C. whereby 99.8% of the 8 kg./h. of the phthalic acid anhydride contained in the gas are precipitated in crystalline form, which crystalline material is periodically melted out. Traces of phthalic acid anhydride free dust are separated from the gas stream flowing off in the cyclone 5.

In the tube filter 6 there are collected, in addition to the phthalic acid anhydride, volatile impurities and particularly 1,2-naphthoquinone.

Beyond the cyclone 5 and/or the tube filter 6, the moving carrier gas, which still contains at the most 0.1 g. of phthalic acid anhydride as vapor/$Nm.^3$, is mixed with the small partial stream of gas with which the conical parts of the evaporator 2 and cyclone 3 were heated, thereby being heated by several degrees C., and is returned via the blower 7 to the gas heater.

The phthalic acid anhydride recovered consists of 99.8% phthalic acid anhydride; the non-volatile residue accumulates at the following places and in the following quantities:

In the conical part of the evaporator: 24.7 kg./h., 0.02 weight percent phthalic acid anhydride content, In the cyclone: 0.2 kg./h., 0.3 weight percent phthalic acid anhydride content.

*Results of the analysis of the solid residue*

|   | Weight percent |
|---|---|
| C | 79.0 |
| H | 2.5 |
| N | 0.6 |
| S | 0.8 |
| O | 11.1 |
| Ash | [1] 6.0 |

[1] Mainly $Fe_2O_3$.

EXAMPLE 2

Instead of the combustion product of coke oven gas, carbon dioxide is utilized as a carrier gas. If the gas is employed with an unchanged rotating gas quantity of 200 Nm.³/h. $CO_2$, the gas only needs to be heated to 420 degrees C. The results obtained are substantially the same as in Example 1.

EXAMPLE 3

Figure 5:
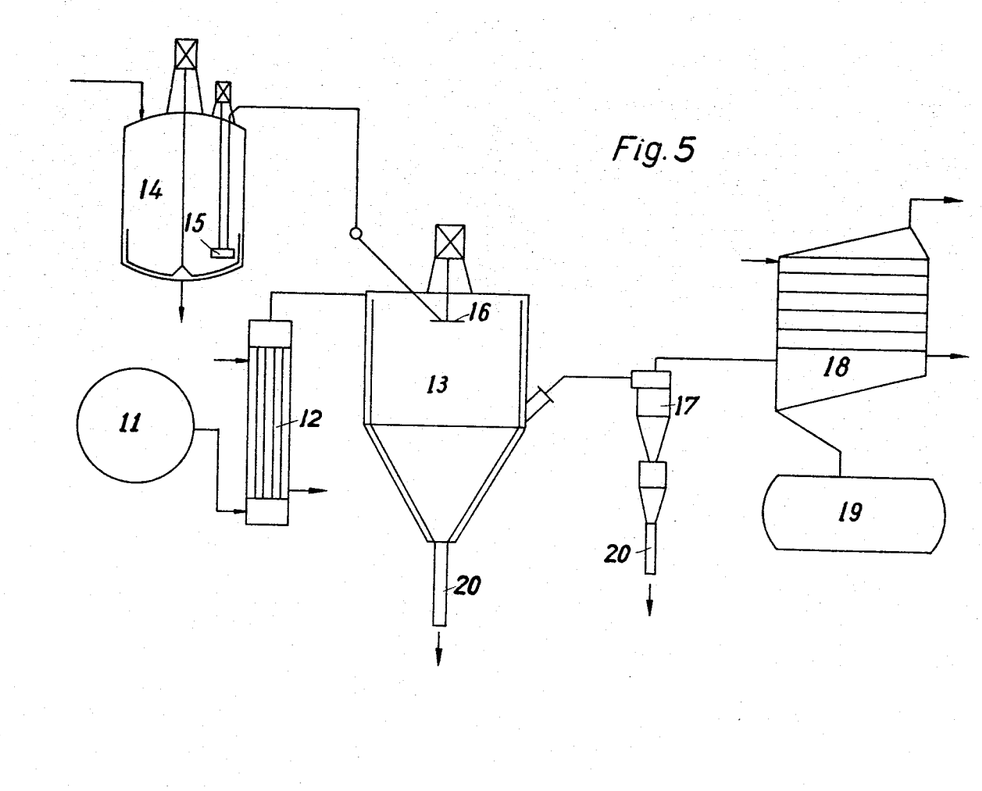
FIGURE 5 is a diagrammatic representation of a further preferred form of apparatus for practicing the invention.

The entire exhaust gas of a reactor employed for the catalytic oxidation of naphthalene and amounting to 5000 m.³/h. and which contains, in addition to 39.1 g./m.³ phthalic acid anhydride, slight quantities of maleic acid anhydride, traces of naphthoquinones and tarry substances, about in volume percent, 78% $N_2$, 17.5% $O_2$, 3% $H_2O$, 0.3% CO, and 1.5% $CO_2$ and which emerges from the reactor 11 at a temperature of about 360 degrees C. is indirectly cooled in the gas cooler 12 with water under formation of steam to about 160 degrees C. The carrier gas at this temperature is thereafter introduced into the evaporator 13 at a point immediately below the evaporator lid from the periphery thereof in a radial current with respect to the axis of the evaporator. This is effected by admitting the gas concentrically from an annular jacket surrounding the evaporator through slots so that, as noted it enters in uniform distribution over the entire circumferential area into the evaporator. The gas may be introduced directly at the top of the evaporator into the annular jacket or at the lowermost end of the jacket of the conical part of the evaporator whereby in this latter instance, it is either heated up and/or kept warm.

From a container 14, provided with a stirring device there are conveyed, at a temperature of about 180–200 degrees C., by means of an immersion pump 15, about 100 kg./h. of the distillation residue from the phthalic acid anhydride main distillation. The distillation residue consists of about 50 weight percent phthalic acid anhydride and 50 weight percent of residue free from phthalic acid anhydride. The distillation residue is conveyed onto the distributor body or centrifugal force atomizer 16, whereby the residue is distributed as multitudinous fine, liquid droplets. From the droplets of molten residue thus formed, the entire phthalic acid anhydride content is evaporated whereby the gas is cooled off by about 5 degrees C. The carrier gas now loaded with about 50 g./Nm.³ phthalic acid anhydride is conducted through one or more cyclone separators 17 for the separation therefrom of the last traces of solid particulate evaporation residue which particulate matter is entirely free from phthalic acid anhydride. The gas is thereafter fed into a separator 18 where the gas is indirectly cooled to about 50–40 degrees C. There is thusly separated from the gas of the total of about 50 grams phthalic acid anhydride/Nm.³ originally carried in with the gas, about 99.5% or possibly even more of the phthalic acid anhydride in the form of crystalline needles as the dew point for 50 g./Nm.³ phthalic anhydride lies at about 131 degrees C.

As is conventional in the customary techniques for phthalic acid anhydride separation, at the time of the melting off of the phthalic acid anhydride crystals into the receiver 19, the carrier gas is conducted through another separator operated in substantially the same manner to free the same of the phthalic acid anhydride contained therein.

The residue substantially free of phthalic anhydride and consisting predominantly of approximately sperically shaped particles having diameters of from 50 to 200 microns collects for the greatest part in the conical underpart of the evaporator 13. The more finely granular particles accumulate in the cyclone separator or separators 17. The solid residue in the form of a dust and capable of flowing drops to the lower part of the evaporator into the column 20 and act as a gas closing device or seal. In order to avoid the matting of the residue dust columns by phthalic acid anhydride needles formed in the cooling and also in order to avoid any possibility of the residue spontaneously igniting, an inert gas and preferably carbon dioxide is introduced approximately midway of the length into the residue dust column 20. Thereby the carrier gas containing any vaporous phthalic acid anhydride is removed from between the particles of the residue.

EXAMPLE 4

5000 Nm.³/h. reaction gas substantially as described in the above example are cooled to about 180 degrees C. in a gas cooler and thereafter divided into a main stream of 4,000 Nm.³/h. which is introduced into the conventional phthalic acid anhydride recovery and into a partial gas stream of 1000 Nm.³/h. The smaller gas stream is loaded with about 100 kg./h. residue, containing phthalic acid anhydride, as has been described in Example 3, in the evaporator 13 by means of a centrifugal force atomizer and after separation of the phthalic acid anhydride free solid residue particles the gas is first cooled to 132 degrees C. In this cooling there is separated out as liquid about 40% of the total content of phthalic acid anhydride amounting to about 90 g./Nm.³ since the dew point for this phthalic acid anhydride content lies at 146 degrees C. The liquid phthalic acid anhydride is continuously accumulated in a storage container. The remaining phthalic acid anhydride is removed from the gas in a separator or separators which are cooled to lower temperatures for separating the phthalic acid anhydride as crystals.

EXAMPLE 5

The reaction gases from the catalytic oxidation of benzene with air are first cooled to about 300 degrees C. in a waste-heat boiler by indirect water cooling under production of steam. The gas consists essentially of the following in volume percent: 76% $N_2$, 14% $O_2$, 5% $H_2O$, 4% $CO_2$+CO, the remainder consisting of maleic acid anhydride, traces of benzene and organic by-products of the oxidation.

At a temperature of about 300 degrees C., the entire amount of reaction gas, amounting to about 4,400 Mm.³/h. is introduced substantially as described in Example 3, as the heating gas into an evaporator which is provided with a rotating distribution body constructed of corrosion-resistant metal and/or a corrosion-resistant metal alloy. The gases containing maleic acid anhydride vapors, emerging from the evaporator are, as described below, conducted to a cooling aggregate in which the greatest part of the maleic acid anhydride is separated out as a liquid at temperatures of above 55 degrees C. The remaining maleic acid anhydride is recovered from the gas leaving the cooling system by washing with water. The washing produces a maleic acid solution which contains about 60 weight percent maleic acid and 40 weight percent water. Of this maleic acid solution, which is being continually accumulated and having a temperature of about 60–80 degrees C., there are hourly fed to the distribution body 130–135 kg.

The maleic acid solution is introduced in the form of fine liquid droplets into the evaporator which is maintained at a temperature of about 300 degrees C. The solution is, under these conditions, decomposed in a very short time into water vapor (steam) and maleic acid anhydride vapor whereby an isomerization of the maleic acid to fumaric acid does not take place. The impurities, consisting of resinous and/or resin-forming substances contained in the aqueous maleic acid solution which do not undergo volatilization under the conditions prevailing in the evaporator remain in the evaporator as very small drops which are collected at the bottom of the evaporator and/or in the after-connected cyclone separators and which are continuously or periodically withdrawn as melt substantially free from maleic acid anhydride.

The gas containing the entire maleic acid anhydride vapor and water vapor from the synthesis and also from the evaporation treatment is introduced into the cyclone separator which it leaves with a temperature of 230 degrees C. The gas is cooled off step-wise first to about 100 degrees C. and thereafter in a cooler acting as a liquid separator to 54 to 55 degrees C. In the temperature range between the dew point for maleic acid anhydride which has been raised through the atomization of the maleic acid solution from about 73 degrees C. to about 80 degrees C. and the final temperature of the gas in the cooler, i.e., about 55 degrees C., about 175 kg./h. raw maleic acid anhydride are separated. That is substantially about the same quantity as was originally in the reactor gas introduced into the evaporator. The gas leaving the liquid separator is conducted directly to a washing unit in which the gas is washed with water whereby the entire residual maleic acid anhydride remaining in the gas is converted into an aqueous solution of maleic acid. The solution of maleic acid is by conventionally known measures brought to the previously indicated concentration and returned to the evaporator.

Through spray atomization of the raw aqueous maleic acid solution, into the evaporator, obviously a purification of the reaction gas is effected which is manifested in that the raw maleic acid anhydride recovered from the liquid separator produces essentially less residue in the preliminary treatment and distillation thereof than when the customary separation procedures heretofore known are employed. It is also possible to combine the maleic acid anhydride containing residues or aqueous maleic acid solutions obtained in the conventional preliminary treatment and distillation measures with the maleic acid solution obtained from the water washing in accordance with the invention and to introduce this mixture into the evaporator. In this manner the combined mixture is decomposed into maleic acid anhydride vapor and water vapor and residue substantially free from maleic acid anhydride.

In the examples, the process in accordance with the invention for the recovery of volatile substances from residues obtained in chemical processes which contain in addition to the volatile substances, non-volatile substances has been exemplified with instances in which residues obtained in the production of phthalic acid anhydride and/or maleic acid anhydride by catalytic oxidation of aromatic hydrocarbons are utilized. The process in accordance with the invention, however, is not limited to such instances but may be successfully employed with residues which are obtained in other processes as for example in the production of carboxylic acids through oxidation processes, as for instance, in the synthesis of benzoic acid or adipic acid. Further, the process in accordance with the invention is applicable quite generally to the processing of all residues which contain, in addition to volatile substances, non-volatile materials. In order to process any such mixture in accordance with the invention, it is necessary that the same be introduced into the evaporator in the form of a liquid, as for example a melt, or in the form of a solution or in a finely ground or dispersed state. In said latter state, a gas or liquid may be used as dispersing agent.

We claim:

1. A process for the separation and recovery of the components of a mixture consisting of a volatile component and a non-volatile component, said volatile component being selected from the group consisting of phthalic acid anhydride and maleic acid anhydride, which comprises establishing a melt of said mixture, introducing said melt in regulated amounts in the form of multidinous fine drops into an evaporation zone so as to provide a large surface area thereof, contacting said melt in said evaporation zone with a gas which is heated to a temperature sufficient to vaporize volatile component, said gas additionally serving as carrier for the vapors formed in said contacting, and recovering the vapors from said carrier gas.

2. Process according to claim 1, wherein said drops have a size within the range of about 20 to 100$\mu$.

3. A process for the separation and recovery of phthalic acid anhydride from a mixture comprising the distillation residue of phthalic acid anhydride derived from the catalytic oxidation of naphthalene with air and consisting of a volatile phthalic acid anhydride component and a non-volatile component, which comprises establishing a melt of said mixture, thereafter introducing said melt in regulated amounts in the form of multitudinous fine drops into an evaporation zone so as to provide a large surface thereof, contacting said melt with a gas heated to a temperature sufficient to vaporize the phthalic acid anhydride volatile component of the mixture, said gas additionally serving as a carrier for the vapors formed in said contacting, and recovering the phthalic acid anhydride from said carrier gas.

4. Process according to claim 3, which comprises separating from said carrier gas at a temperature above its dew point any solid non-volatile particles contained therein, cooling said carrier gas in at least one stage to thereby separate out said phthalic acid anhydride vapors, and separately recovering the non-volatile component of said mixture subtsantially free of phthalic acid anhydride and consisting of solid particles having a diameter of from 50 to 200$\mu$.

5. An apparatus for the separation and recovery of the components of the mixture, consisting of a volatile component and a non-volatile component, comprising a heated supply tank provided with an inlet for said mixture and an outlet for melt formed from said mixture, heated dosing means adapted to deliver said melt onto a rotating distributor adapted to supply said melt as multitudinous fine droplets, said distributor being a bowl open at the top and being positioned in an evaporator provided with gas inlet and gas outlet means and separate solid outlet means, means communicating with said gas outlet adapted for removing any non-gaseous substances contained in the discharge gas, cooling means for treating the gas and separate collecting means for said volatile and non-volatile components.

6. Apparatus according to claim 5, wherein the evaporator comprises a shell enclosing an evaporation zone disposed for receiving said fine droplets from said distributor and a jacket defining an annular space about the evaporating zone, means for introducing heated gas into said annular space, means communicating said annular space with said evaporation zone for passage of heating gas from the annular space to the evaporation zone following flow of gas through the annular space for indirect heat transfer to the evaporation zone.

7. Process according to claim 3, wherein said melt is provided in the form of said fine drops by a rotating distributor having a peripheral velocity of 5–90 m./sec. to provide droplets of size about 20 to 100$\mu$.

8. Process according to claim 4, wherein said melt is provided in the form of said fine drops by a rotating distributor having a peripheral velocity of 5–90 m./sec. to provide droplets of size about 20 to 100μ.

9. Process according to claim 1, wherein said volatile component is phthalic acid anhydride.

10. Process according to claim 1, wherein said volatile component is maleic acid anhydride.

11. Process according to claim 1, wherein said gas is carbon dioxide.

References Cited by the Examiner

UNITED STATES PATENTS

| | | | |
|---|---|---|---|
| 1,798,166 | 3/1931 | Mensing | 159—4 |
| 1,987,282 | 1/1935 | Comte | 183—119 |
| 1,987,301 | 1/1935 | Livingston | 183—119 |
| 2,219,333 | 10/1940 | Rodgers | 260—346.7 |
| 2,445,314 | 11/1948 | Pietzsch | 260—346.7 |
| 2,702,091 | 2/1955 | Smith | 260—346.7 |
| 2,951,555 | 9/1960 | Cooper | 260—346.8 |
| 3,002,980 | 10/1961 | Michel | 260—346.7 |

OTHER REFERENCES

Perry: Chem. Engineer's Handbook, Third Edition, 1950, pages 1170–1.

ALEX MAZEL, *Primary Examiner.*

IRVING MARCUS, WALTER A. MODANCE,
*Examiners.*

H. R. JILES, *Assistant Examiner.*

UNITED STATES PATENT OFFICE
CERTIFICATE OF CORRECTION

Patent No. 3,280,009                              October 18, 1966

Paul Ackermann et al.

It is hereby certified that error appears in the above numbered patent requiring correction and that the said Letters Patent should read as corrected below.

In the heading to the printed specification, line 6, for "Chemie Homberg" read -- Chemie, Homberg --; column 3, line 17, for "he carrier" read -- the carrier --; column 8, lines 9 and 10, for "sperically" read -- spherically --; line 60, for "Mm.$^3$/h." read -- Nm.$^3$/h. --; column 10, line 12, for "multidinous" read -- multitudinous --; column 12, line 3, for "2,445,314" read -- 2,455,314 --.

Signed and sealed this 12th day of September 1967.

(SEAL)
Attest:

ERNEST W. SWIDER                              EDWARD J. BRENNER
Attesting Officer                              Commissioner of Patents